Patented Oct. 25, 1938

2,134,510

UNITED STATES PATENT OFFICE 2,134,510

FIELD WINDING FOR UNIPOLAR GENERATORS

Floyd T. Hague, Pittsburgh, and Frederick R. J. Davis, Irwin, Pa., assignors to Westinghouse Electric & Manufacturing Company, East Pittsburgh, Pa., a corporation of Pennsylvania Application December 14, 1935, Serial No. 54,517

19 Claims. (Cl. 171—212)

Our invention relates to field windings for unipolar generators, and particularly to the disposition of the field excitation means in such manner as to control the current-distribution among the axially distributed brushes bearing on the long collector cylinders at each end of a heavy-duty, low-voltage unipolar generator, such as a unipolar generator capable of delivering 150,000 amperes at something like 7 volts.

Our invention has particular relation to compensated unipolar generators, in which the armature reaction is substantially eliminated and the internal inductance of the machine is accordingly greatly reduced. In such machines, the main generator leads are both connected at one end of the machine, and the brushes at the other end of the machine are connected to the compensating bars or windings. In such machines the distribution of the current among the axially displaced brushes is usually different at the two ends of the machine and it is usually desirable to provide means for separately taking care of the tendencies toward unequal current-distributions among the brushes at the two ends of the machine.

It is the object of our present invention to provide means for improving the distribution of current among the axially displaced brushes on such machines.

Figure 1:
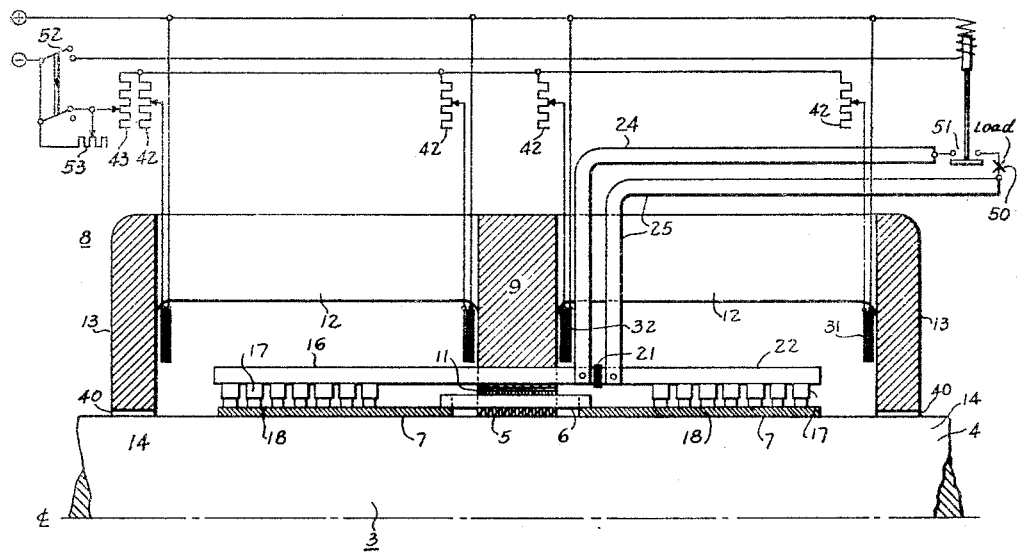
Figure 2:
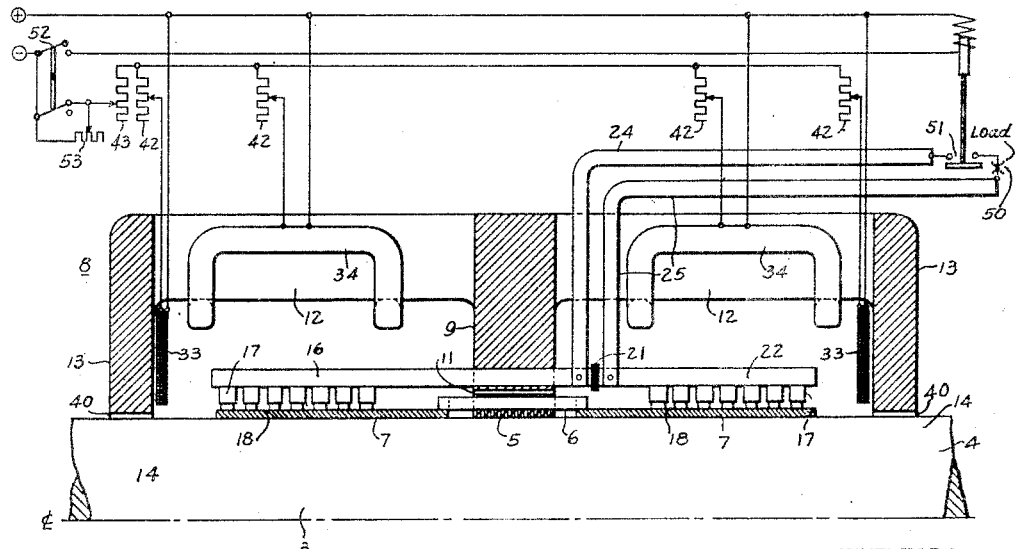

Our invention is illustrated somewhat diagrammatically and schematically in two preferred embodiments in the accompanying drawing, in which Figure 1 is a diagrammatic sectional view of the top half of a unipolar generator, with a schematic indication of the circuits and apparatus which are electrically associated therewith, wherein the brush-current distribution is controlled by means of two annular field coils at each end of the machine, one on the outer end and the other at the inner end of the collector cylinder at that end of the machine, and Fig. 2 is a similar view, wherein the brush-current distributing means is in the form of auxiliary field coils disposed underneath the arms of the stator frame.

Our invention is illustrated as being applied to a compensated unipolar generator having a rotor member 3 including a shaft 4 of magnetizable material, an intermediately disposed rotor-core 5 which is slotted, the slots carrying armature winding bars 6 therein, and a long collector-cylinder 7 disposed at each end of the rotor-core, the armature bars being connected to the respective collector-cylinders 7. The machine has a stator member 8 comprising an intermediately disposed stator-core 9 surrounding the rotor-core 5 and separated therefrom by a cylindrical air-gap 11. The outer periphery of the stator-core 9 is joined to two axially extending frame members in the form of a plurality of arms 12, extending toward each end of the machine, and terminating in end brackets 13 which complete the magnetic circuit from each frame member to a point 14 in the shaft 4, outside of the respective collector cylinders 7.

The stator-core 9 is slotted, and the slots carry a plurality of circumferentially spaced compensating bars 16. On the left-hand end of the machine, as illustrated, these compensating bars 16 are extended to provide brushholder-supporting bars at that end of the machine, each bar carrying a large number of axially distributed brushholders 17 which, in turn, support brushes 18 bearing upon the collector-cylinder 7 at that end of the machine. At the right-hand end of the machine, as illustrated, the compensating bars 16 terminate close to the stator-core 9, and are joined, by insulating connecting means 21, to a plurality of separate brushholder-supporting bars 22 which support the brushholders 18 at that end of the machine.

Two sets of generator terminal leads 24 and 25, of opposite polarities, are connected onto the bars 16 and 22, on opposite sides of the insulating connection 21. The leads 25, which are connected to the separate brushholder-supporting bars 22 at the right-hand end of the machine, are preferably connected to these bars at their inner ends, as shown, so as to be close to the other leads 24, in order to reduce the inductive effects, although our invention is not altogether limited to this precise point of connection of the leads 25 to the bars 22.

The compensated unipolar generator is described and claimed in our copending application Serial No. 54,518, filed December 14, 1935, for a Compensated unipolar generator.

In Fig. 1 of our accompanying drawing, we show the field excitation means for our compensated generator as comprising, at each end of the machine, two shaft-encircling coils 31 and 32, the coil 31 being disposed close to the insides of the end-brackets 13, that is, at the outer ends of the respective collector-cylinders 7 at their respective ends of the machine, and the coils 32 being disposed close to the stator core, that is at the inner ends of the respective collector cylinders 7.

In the embodiment of our invention shown in

Fig. 2 the main field-windings are in the form of coils 33 disposed immediately within the end-brackets 13. For controlling the distribution of current among the axially displaced brushes, a plurality of auxiliary field coils 34 are provided, each coil 34 being disposed underneath, and around two of the sides of, one of the stator-frame arms 12, so as to control the leakage flux between said frame-arm and the portion of the shaft 4 underneath the same.

When a unipolar generator of this type is operated so as to deliver a voltage, there is a leakage-flux passing between the portions of the magnetizable rotor-shaft underneath the two collector-cylinders 7, and the frame-arms 12 thereabove, and hence the rotation of the rotor member causes a voltage to be generated in each of the collector-cylinders 7, in the same manner that the rotation of the machine causes a voltage to be generated in the armature conductors 6 by reason of the main flux of the machine in the air-gap 11. If the field-excitation is provided solely by windings located at the outer ends of the two collectors, such as the windings 31 in Fig. 1, or the windings 33 in Fig. 2, this leakage-flux is in such direction that the voltage generated between the extreme outer end of one collector-cylinder 7 and the extreme outer end of the other collector-cylinder 7 is larger than the voltage generated between the extreme inner ends of the two collector-cylinders. Conversely, if the machine-excitation is supplied solely by field-windings located at the inner ends of the two collectors, such as the coils 32 in Fig. 1, the voltage is a maximum at the inner ends of the two collectors, and decreases steadily out to the extreme ends of the two collectors.

Reference to the drawing will show that our machine has a current-loop at each end thereof, consisting of the collector-cylinder 7 and the brushholder-supporting bars 16 or 22, with the distributed brushholders 17 and brushes 18 disposed therebetween, one end of the current-loop being the inner end of the collector-cylinder, and the other end of the loop being the inner ends of the brushholder-supporting bars 16 and 22, respectively. It will be noted that current enters at one end of the loop and leaves at the other end, and that the current which travels to the extreme outer ends of the brushholder-supporting bars and of the collector-cylinder traverses a much longer path than the current which passes through the brushholders closer to the stator and rotor-cores. With the field windings located at the inner ends of the respective collectors 7, there is less voltage available to force current through the brushes at the outer ends of the collectors and to overcome the resistance-drops in the length of the collector itself and in the brush-circuits of the aforesaid loop-circuits, than at the inner ends of the collectors, whereas, in the first case, with the field windings located at the outer ends of the respective collectors, the excess of voltage between the outer ends of the collectors tends to either, partially, exactly, or more than offset the resistance-drop through the lengths of the collectors and of the brushholder-supporting bars 16 and 22, and thus tends to improve the equality of distribution of current among the brushes throughout the lengths of the respective collector-cylinders 7.

In the form of our invention shown in Fig. 2, where the main field-windings are disposed at the outer ends of the collectors, as indicated at 33, it is a design-requirement, in accordance with our invention, that the radial distance between the surface of the shaft under each collector-cylinder 7 and the inner portions of the frame-arms 12 radially above the same must be such that the leakage-flux is substantially exactly the amount necessary to overcome the resistance-drop in each of the aforesaid current-loops at the two ends of the machine. The design must, therefore, take into consideration the ampere-turns required by the main air-gap 11, which defines the magnetomotive force tending to produce the leakage flux; the speed of rotation of the machine, which affects the amount of voltage generated by the rotation of the collector-cylinders 7 in the leakage-flux; and the resistance-drops in the collector-cylinders and in the corresponding brush-circuits.

In order to produce a more flexible design we prefer to add, in Fig. 2, the auxiliary coils 34, as hereinabove described, whereby a means is provided for separately adjusting the leakage-flux between each of the frame-arms 12 and the portion of the shaft 7 thereunder, so that the design-principle as to the leakage-fluxes, as just described, may be more conveniently carried out, with fewer limitations in exact niceties of the design, although it is desirable to make the design such that the duty imposed upon the auxiliary coils 34 is as light as is conveniently practicable. It will be noted that the auxiliary coils 34 may be excited in either direction, so as to either increase or decrease the leakage-flux.

In the form of our invention shown in Fig. 1, the main ampere-turns, required to force the flux through the main air-gap 11 (assuming no iron-saturation) is supplied by the inner field-coils 32. The outer field-coils 31 supply the ampere-turns necessary to force the flux across the air-gaps 40 between the end-brackets 13 and the portions 14 of the shaft 4 thereunder, and also the ampere-turns necessary to produce the leakage-flux which is required in order to substantially equalize the current-distribution in the axially distributed brushes, as above described.

Due to the presence of the generator-leads 24 and 25, the brush-current distribution-conditions at the two ends of the machines are always slightly different, and they may be considerably different, particularly if the generator-lead 25 is attached to the outer ends of the brushholder-supporting bars 22, rather than to the inner ends thereof, as shown. Under load-conditions of the machine it almost invariably happens that more leakage-flux is desired at one end of the machine than at the other in order to effect an equable distribution of the brush-currents, and this increased leakage-flux may be obtained by an increase of the excitation of the shunt-coil at the outer end of the collector-cylinder where the additional leakage-flux is required, said increase being compensated, of course, by a corresponding decrease in excitation at the other end of the machine, if the total generated voltage is to be held constant. As a feature of our invention, therefore, we provide means for separately controlling the effective field-ampere-turns of the coils 31 or 33 at the two ends of our machine.

The drawing shows schematically one conventional form of embodiment whereby the various field-coils may be excited, with their excitation conveniently controlled. A separate rheostat 42 is provided for each one of the four coils 31 and 32 in Fig. 1, and for each one of the four coils 33 and 34 in Fig. 2, it being understood, in Fig. 2, that the plurality of auxiliary coils 34 which are associated with the plurality of frame-arms 12 at each end of the machine are all connected together, in series or parallel, and considered as a single auxiliary flux-controlling means which is connected and controlled by one of the rheostats 42, for controlling the leakage-flux at that end of the machine, for all of the frame-arms 12 at that end of the machine. A proper manipulation of the several rheostats 42, in accordance with the principles hereinabove described, will properly control the distribution of the leakage-fluxes at the two ends of the machine, whereby desirable current-distribution will be obtained in the axially displaced brushes 18. The terminal voltage of the generator is regulated by means of a separate rheostat 43 which controls all of the field-windings at once.

We have found, by experience, that, in spite of all that we could do to minimize unequal distribution in a circumferential direction, that is, between the brushholders disposed at different points around the circumference of the respective collector cylinders 7, and in spite of our utilization of compensating bars 16, there is a certain amount of compounding action of the machine when the machine is supplying a load. So far, we have found this compounding action to be in a direction to increase the machine-voltage, although theoretically it might be either additive or subtractive with respect to the machine-flux.

The objection to such a compounding action, in a large unipolar generator, is that the time required to build up the flux in the generator, due to the massive iron parts of the magnetic circuits, is very long, of the order of several minutes, so that if any change is made in the effective ampere-turns tending to send flux through the magnetic flux-paths of such a machine, it will be a matter of minutes before the flux finally reaches its ultimate value as a result of such change. If such change in the effective ampere-turns tending to drive flux through the machine occurs at the moment when load is applied to the machine, obviously the output-voltage and current of the machine will be varying for a long period of time, possibly of the order of minutes, after the machine starts to operate. If the load attached to the machine is one in which it is desired to obtain a constant current or a constant voltage, it will be obvious that such result will not be obtained during the first minute or so of the operation of the machine, or whatever the time is, for the machine to reach steady-state conditions.

Our machine is particularly adapted for low-voltage work requiring extremely high currents, such as electrolytic work, and resistance-welding applications. In a pipe-welding job, for example, where a long strap of metal is bent around into cylindrical formation, and the edges joined by resistance-welding, to complete the pipe, the properties of the welded joint are very critically dependent upon the exact amount of current-flow. As each length of pipe takes considerably less than a minute to pass through the welding head, and as the portions of the pipe which are subjected to welding currents other than the exact predetermined amount of current are usually lost or scrapped, because of imperfect welds, it will be obvious that uncorrected compounding-effects due to the flow of welding-current in the generator cannot be tolerated.

We have found that these compounding effects may be exactly compensated for, or otherwise controlled in those applications in which a certain amount of compounding may be desired, either in the additive direction or in the differential direction, by cutting in or out a block of non-inductive resistance in a circuit in series or shunt with the exciting coils of the machine, at the instant when load is applied.

As shown in the drawing, the load is indicated at 50, an electromagnetic contactor is indicated at 51, whereby the load is connected to the generator, and a double-pole control-switch is schematically indicated at 52, the same being intended to be a schematic illustration of any suitable means for actuating the load-switch or contactor 51 and for simultaneously controlling a non-inductive resistor 53 which is utilized for the purpose of suddenly changing the shunt-excitation of the machine at the moment when the compounding excitation becomes effective. In the illustrated control-system, when the control-switch 52 is open, the electro-magnetic contactor 51 is deenergized or open, and the non-inductive resistance 53 is short-circuited out of the field-winding circuits of the machine. When the control-switch 52 is closed, the electro-magnetic contactor 51 is energized, so as to close the same and connect the load 50 to the generator-terminals 24 and 25, and at the same time, the non-inductive resistance 53 is connected in series with the field windings.

While we have illustrated our invention in two forms of embodiment which are at present preferred by us, it will be obvious that many details of construction and application may be changed without departing from the essential spirit of our invention. We desire, therefore, that the appended claims shall be accorded the broadest construction consistent with their language and the prior art.

We claim as our invention:

1. A unipolar generator comprising a motor member including a shaft of magnetizable material, an intermediately disposed rotor-core, and a collector-cylinder disposed at each end of the rotor-core, a stator member including an intermediately disposed stator-core surrounding said rotor-core and separated therefrom by a cylindrical air-gap, said stator member also including a frame member extending axially in each direction from the outer periphery of the stator-core, and an end-bracket for completing the magnetic circuit from each frame member to a point in the shaft outside of the collector-cylinder at that end of the machine, means, including a large number of brushes, spaced both axially and circumferentially, for leading the current respectively from and to the respective collector-cylinders, and stator field-exciter means including a field-coil surrounding the shaft and disposed inside of each of said end-brackets at the ends of the collector-cylinders furthest removed from said cores, the radial spacings between the portions of the shaft underneath said collector-cylinders and the corresponding axially extending frame members being such, in comparison with the ampere-turns required by the air-gap, the speed of rotation, and the resistance-drops in the collector-cylinders and in the corresponding brush-circuits, that the electromotive force generated by the rotation of each collector-cylinder in its leakage flux is approximately equal and opposite to its aforesaid resistance-drops, whereby approximately equal current-distribution is obtained for all of the brushes regardless of their axial position on either one of the respective collector-cylinders.

2. A unipolar generator comprising a rotor member including a shaft of magnetizable material, an intermediately disposed rotor-core, and a collector-cylinder disposed at each end of the rotor-core, a stator member including an intermediately disposed stator-core surrounding said rotor-core and separated therefrom by a cylindrical air-gap, said stator member also including a frame member extending axially in each direction from the outer periphery of the stator-core, and an end-bracket for completing the magnetic circuit from each frame member to a point in the shaft outside of the collector-cylinder at that end of the machine, a plurality of circumferentially spaced brushholder-supporting bars extending axially, in spaced relation, over each of the collector-cylinders, brushholder means carried by the brushholder-supporting bars for holding a large number of brushes, spaced both axially and circumferentially, for leading the current respectively from and to the respective collector-cylinders, circuit-connections for providing a loop-circuit at at least one of said collector-cylinders whereby current flows from substantially one end of the loop-circuit to substantially the other end thereof, said loop-circuit extending from the rotor-core end of said one of the collector-cylinders to the stator-core end of the brushholder-supporting bars thereabove, and stator field-exciter means including a field-coil surrounding the shaft and disposed inside of each of said end-brackets, at the ends of the collector cylinders furthest removed from said cores, the radial spacings between the portion of the shaft underneath said one of the collector-cylinders and the corresponding axially extending frame member being such, in comparison with the ampere-turns required by the air-gap, the speed of rotation, and the resistance-drops in the collector-cylinder and in the corresponding brush-circuits, that the electromotive force generated by the rotation of said collector-cylinder in its leakage flux is approximately equal and opposite to its aforesaid resistance-drops, whereby approximately equal current-distribution is obtained for all of the brushes associated with said one of the collector-cylinders.

3. A compensated unipolar generator comprising a rotor member including a shaft of magnetizable material, an intermediately disposed rotor-core, and a collector-cylinder disposed at each end of the rotor-core, a stator member including an intermediately disposed stator-core surrounding said rotor-core and separated therefrom by a cylindrical air-gap, said stator-core being slotted, a plurality of circumferentially spaced compensating bars disposed in said slots of the stator-core, said compensating bars having long ends extending axially, in spaced relation, over the collector-cylinder at one end of the machine, to provide brushholder-supporting bars at that end of the machine, said compensating bars having short ends terminating close to the stator-core, at the second end of the machine, a plurality of circumferentially spaced, separate brushholder-supporting bars extending axially, in spaced relation, over the collector-cylinder at said second end of the machine, said separate brushholder-supporting bars being insulated from said short ends of the compensating bars, brushholder means associated with each brushholder-supporting bar for holding a plurality of axially spaced brushes bearing on the collector-cylinder at its end of the machine, each group of axially spaced brushes, at each end of the machine, being electrically connected to one of said brushholder-supporting bars, generator-leads of one polarity connected to the brushholder-supporting bars at said second end of the machine, and generator-leads of the opposite polarity connected to the short ends of said compensating bars at said second end of the machine, said stator member also including a frame member extending axially in each direction from the outer periphery of the stator-core, and an end-bracket for completing the magnetic circuit from each frame member to a point in the shaft outside of the collector-cylinder at that end of the machine, and stator field-exciter means including a field-coil surrounding the shaft and disposed inside of each of said end-brackets, at the ends of the collector-cylinders furthest removed from said cores, the radial spacings between at least the portion of the shaft underneath the collector-cylinder at the first-mentioned end of the machine and the corresponding axially extending frame member being such, in comparison with the ampere-turns required by the air-gap, the speed of rotation, and the resistance-drops in said collector-cylinder and in the corresponding brush-circuits, that the electromotive force generated by the rotation of said collector-cylinder in its leakage flux is approximately equal and opposite to its aforesaid resistance-drops, whereby approximately equal current-distribution is obtained for all of the brushes associated with said collector-cylinder.

4. A compensated unipolar generator comprising a rotor member including a shaft of magnetizable material, an intermediately disposed rotor-core, and a collector-cylinder disposed at each end of the rotor-core, a stator member including an intermediately disposed stator-core surrounding said rotor-core and separated therefrom by a cylindrical air-gap, said stator-core being slotted, a plurality of circumferentially spaced compensating bars disposed in said slots of the stator-core, said compensating bars having long ends extending axially, in spaced relation, over the collector-cylinder at one end of the machine, to provide brushholder-supporting bars at that end of the machine, said compensating bars having short ends terminating close to the stator-core, at the second end of the machine, a plurality of circumferentially spaced, separate brushholder-supporting bars extending axially, in spaced relation, over the collector-cylinder at said second end of the machine, said separate brushholder-supporting bars being insulated from said short ends of the compensating bars, brushholder means associated with each brushholder-supporting bar for holding a plurality of axially spaced brushes bearing on the collector-cylinder at its end of the machine, each group of axially spaced brushes, at each end of the machine, being electrically connected to one of said brushholder-supporting bars, generator-leads of one polarity connected to the brushholder-supporting bars at said second end of the machine, said connection being made at the ends of said brushholder-supporting bars adjacent to said short ends of the compensating bars, and generator-leads of the opposite polarity connected to the short ends of said compensating bars at said second end of the machine, said stator member also including a frame member extending axially in each direction from the outer periphery of the stator-core, and an end-bracket for completing the magnetic circuit from each frame member to a point in the shaft outside of the collector-cylinder at that end of the machine, and stator field-exciter means including a field-coil surrounding the shaft and disposed inside of each of said end-brackets, at the ends of the collector-cylinders furthest removed from said cores, the radial spacings between the portions of the shaft underneath said collector-cylinders and the corresponding axially extending frame members being such, in comparison with the ampere-turns required by the air-gap, the speed of rotation, and the resistance-drops in the collector-cylinders and in the corresponding brush-circuits, that the electromotive force generated by the rotation of each collector-cylinder in its leakage flux is approximately equal and opposite to its aforesaid resistance-drops, whereby approximately equal current-distribution is obtained for all of the brushes regardless of their axial position on either one of the respective collector-cylinders.

5. A unipolar generator comprising a rotor member including a shaft of magnetizable material, an intermediately disposed rotor-core, and a collector-cylinder disposed at each end of the rotor-core, a stator member including an intermediately disposed stator-core surrounding said rotor-core and separated therefrom by a cylindrical air-gap, said stator member also including a frame member extending axially in each direction from the outer periphery of the stator-core, and an end-bracket for completing the magnetic circuit from each frame member to a point in the shaft outside of the collector-cylinder at that end of the machine, means, including a large number of brushes, spaced both axially and circumferentially, for leading the current respectively from and to the respective collector-cylinders, and stator field-exciter means, said stator field-exciter means including a field-coil surrounding the shaft and disposed inside of each of said end-brackets, at the ends of the collector-cylinders furthest removed from said cores, and other field-coil means for controlling the leakage-flux between the portion of the shaft underneath at least one of the collector-cylinders and the corresponding axially extending frame member.

6. A unipolar generator comprising a rotor member including a shaft of magnetizable material, an intermediately disposed rotor-core, and a collector-cylinder disposed at each end of the rotor-core, a stator member including an intermediately disposed stator-core surrounding said rotor-core and separated therefrom by a cylindrical air-gap, said stator member also including a frame member extending axially in each direction from the outer periphery of the stator-core, and an end-bracket for completing the magnetic circuit from each frame member to a point in the shaft outside of the collector-cylinder at that end of the machine, a plurality of circumferentially spaced brushholder-supporting bars extending axially, in spaced relation, over each of the collector-cylinders, brushholder means carried by the brushholder-supporting bars for holding a large number of brushes, spaced both axially and circumferentially, for leading the current respectively from and to the respective collector-cylinders, circuit-connections for providing a loop-circuit at at least one of said collector-cylinders whereby current flows from substantially one end of the loop-circuit to substantially the other end thereof, said loop-circuit extending from the rotor-core end of said one of the collector-cylinders to the stator-core end of the brushholder-supporting bars thereabove, and stator field-exciter means, said stator field-exciter means including a field-coil surrounding the shaft and disposed inside of each of said end-brackets, at the ends of the collector-cylinders furthest removed from said cores, and other field-coil means for controlling the leakage-flux between the portion of the shaft underneath said one of the collector-cylinders and the corresponding axially extending frame member.

7. A compensated unipolar generator comprising a rotor member including a shaft of magnetizable material, an intermediately disposed rotor-core, and a collector-cylinder disposed at each end of the rotor-core, a stator member including an intermediately disposed stator-core surrounding said rotor-core and separated therefrom by a cylindrical air-gap, said stator-core being slotted, a plurality of circumferentially spaced compensating bars disposed in said slots of the stator-core, said compensating bars having long ends extending axially, in spaced relation, over the collector-cylinder at one end of the machine to provide brushholder-supporting bars at that end of the machine, said compensating bars having short ends terminating close to the stator-core, at the second end of the machine, a plurality of circumferentially spaced, separate brushholder-supporting bars extending axially, in spaced relation, over the collector-cylinder at said second end of the machine, said separate brushholder-supporting bars being insulated from said short ends of the compensating bars, brushholder means associated with each brushholder-supporting bar for holding a plurality of axially spaced brushes bearing on the collector-cylinder at its end of the machine, each group of axially spaced brushes, at each end of the machine, being electrically connected to one of said brushholder-supporting bars, generator-leads of one polarity connected to the brushholder-supporting bars at said second end of the machine, and generator-leads of the opposite polarity connected to the short ends of said compensating bars at said second end of the machine, said stator member also including a frame member extending axially in each direction from the outer periphery of the stator-core, and an end-bracket for completing the magnetic circuit from each frame member to a point in the shaft outside of the collector-cylinder at that end of the machine, and stator field-exciter means, said stator field-exciter means including a field-coil surrounding the shaft and disposed inside of each of said end-brackets, at the ends of the collector-cylinders furthest removed from said cores, and other field-coil means for controlling the leakage flux between at least the portion of the shaft underneath the collector-cylinder at the first-mentioned end of the machine and the corresponding axially extending frame member.

8. A compensated unipolar generator comprising a rotor member including a shaft of magnetizable material, an intermediately disposed rotor-core, and a collector-cylinder disposed at each end of the rotor-core, a stator member including an intermediately disposed stator-core surrounding said rotor-core and separated therefrom by a cylindrical air-gap, said stator-core being slotted, a plurality of circumferentially spaced compensating bars disposed in said slots of the stator-core, said compensating bars having long ends extending axially, in spaced relation, over the collector-cylinder at one end of the machine to provide brushholder-supporting bars at that end of the machine, said compensating bars having short ends terminating close to the stator-core, at the second end of the machine, a plurality of circumferentially spaced, separate brushholder-supporting bars extending axially, in spaced relation, over the collector-cylinder at said second end of the machine, said separate brushholder-supporting bars being insulated from said short ends of the compensating bars, brushholder means associated with each brushholder-supporting bar for holding a plurality of axially spaced brushes bearing on the collector-cylinder at its end of the machine, each group of axially spaced brushes, at each end of the machine, being electrically connected to one of said brushholder-supporting bars, generator-leads of one polarity connected to the brushholder-supporting bars at said second end of the machine, said connection being made at the ends of said brushholder-supporting bars adjacent to said short ends of the compensating bars, and generator-leads of the opposite polarity connected to the short ends of said compensating bars at said second end of the machine, said stator member also including a frame member extending axially in each direction from the outer periphery of the stator-core, and an end-bracket for completing the magnetic circuit from each frame member to a point in the shaft outside of the collector-cylinder at that end of the machine, and stator field-exciter means, said stator field-exciter means including a field-coil surrounding the shaft and disposed inside of each of said end-brackets, at the ends of the collector-cylinders furthest removed from said cores, and other field-coil means for controlling the leakage flux between the portions of the shaft underneath said collector-cylinders and the corresponding axially extending frame members.

9. A unipolar generator comprising a rotor member including a shaft of magnetizable material, an intermediately disposed rotor-core, and a collector-cylinder disposed at each end of the rotor-core, a stator member including an intermediately disposed stator-core surrounding said rotor-core and separated therefrom by a cylindrical air-gap, said stator member also including a frame member including a plurality of arms extending axially in each direction from the outer periphery of the stator-core, and an end-bracket for completing the magnetic circuit from each frame member to a point in the shaft outside of the collector-cylinder at that end of the machine, means, including a large number of brushes, spaced both axially and circumferentially, for leading the current respectively from and to the respective collector-cylinders, and stator field-exciter means, said stator field-exciter means including a field-coil surrounding the shaft and disposed inside of each of said end-brackets, at the ends of the collector-cylinders furthest removed from said cores, and another field-coil disposed underneath each frame-member arm at at least one end of the machine for controlling the leakage-flux between said arms and the portion of the shaft underneath the collector-cylinder at that end of the machine.

10. A unipolar generator comprising a rotor member including a shaft of magnetizable material, an intermediately disposed rotor-core, and a collector-cylinder disposed at each end of the rotor-core, a stator member including an intermediately disposed stator-core surrounding said rotor-core and separated therefrom by a cylindrical air-gap, said stator member also including a frame member including a plurality of arms extending axially in each direction from the outer periphery of the stator-core, and an end-bracket for completing the magnetic circuit from each frame member to a point in the shaft outside of the collector-cylinder at that end of the machine, a plurality of circumferentially spaced brushholder-supporting bars extending axially, in spaced relation, over each of the collector-cylinders, brushholder means carried by the brushholder-supporting bars for holding a large number of brushes, spaced both axially and cicumferentially, for leading the current respectively from and to the respective collector-cylinders, circuit-connections for providing a loop-circuit at at least one of said collector-cylinders whereby current flows from substantially one end of the loop-circuit to substantially the other end thereof, said loop-circuit extending from the rotor-core end of said one of the collector-cylinders to the stator-core end of the brushholder-supporting bars thereabove, and stator field-exciter means, said stator field-exciter means including a field-coil surrounding the shaft and disposed inside of each of said end-brackets, at the ends of the collector-cylinders furthest removed from said cores, and another field-coil disposed underneath each frame-member arm at at least said loop-circuit end of the machine for controlling the leakage-flux between said arms and the portion of the shaft underneath the collector-cylinder at that end of the machine.

11. A compensated unipolar generator comprising a rotor member including a shaft of magnetizable material, an intermediately disposed rotor-core, and a collector-cylinder disposed at each end of the rotor-core, a stator member including an intermediately disposed stator-core surrounding said rotor-core and separated therefrom by a cylindrical air-gap, said stator-core being slotted, a plurality of circumferentially spaced compensating bars disposed in said slots of the stator-core, said compensating bars having long ends extending axially, in spaced relation, over the collector-cylinder at one end of the machine to provide brushholder-supporting bars at that end of the machine, said compensating bars having short ends terminating close to the stator-core, at the second end of the machine, a plurality of circumferentially spaced, separate brushholder-supporting bars extending axially, in spaced relation, over the collector-cylinder at said second end of the machine, said separate brushholder-supporting bars being insulating from said short ends of the compensating bars, brushholder means associated with each brushholder-supporting bar for holding a plurality of axially spaced brushes bearing on the collector-cylinder at its end of the machine, each group of axially spaced brushes, at each end of the machine, being electrically connected to one of said brushholder-supporting bars, generator-leads of one polarity connected to the brushholder-supporting bars at said second end of the machine, and generator-leads of the opposite polarity connected to the short ends of said compensating bars at said second end of the machine, said stator member also including a frame member including a plurality of arms extending axially in each direction from the outer periphery of the stator-core, and an end-bracket for completing the magnetic circuit from each frame member to a point in the shaft outside of the collector-cylinder at that end of the machine, and stator field-exciter means, said stator field-exciter means including a field-coil surrounding the shaft and disposed inside of each of said end-brackets, at the ends of the collector-cylinders furthest removed from said cores, and another field-coil disposed underneath each frame-member arm at at least the first-mentioned end of the machine for controlling the leakage-flux between said arms and the portion of the shaft underneath the collector-cylinder at that end of the machine.

12. A compensated unipolar generator comprising a rotor member including a shaft of magnetizable material, an intermediately disposed rotor-core, and a collector-cylinder disposed at each end of the rotor-core, a stator member including an intermediately disposed stator-core surrounding said rotor-core and separated therefrom by a cylindrical air-gap, said stator-core being slotted, a plurality of circumferentially spaced compensating bars disposed in said slots of the stator-core, said compensating bars having long ends extending axially, in spaced relation, over the collector-cylinder at one end of the machine to provide brushholder-supporting bars at that end of the machine, said compensating bars having short ends terminating close to the stator-core, at the second end of the machine, a plurality of circumferentially spaced, separate brushholder-supporting bars extending axially, in spaced relation, over the collector-cylinder at said second end of the machine, said separate brushholder-supporting bars being insulated from said short ends of the compensating bars, brushholder means associated with each brushholder-supporting bar for holding a plurality of axially spaced brushes bearing on the collector-cylinder at its end of the machine, each group of axially spaced brushes, at each end of the machine, being electrically connected to one of said brushholder-supporting bars, generator-leads of one polarity connected to the brushholder-supporting bars at said second end of the machine, said connection being made at the ends of said brushholder-supporting bars adjacent to said short ends of the compensating bars, and generator-leads of the opposite polarity connected to the short ends of said compensating bars at said second end of the machine, said stator member also including a frame member including a plurality of arms extending axially in each direction from the outer periphery of the stator-core, and an end-bracket for completing the magnetic circuit from each frame member to a point in the shaft outside of the collector-cylinder at that end of the machine, and stator field-exciter means, said stator field-exciter means including a field-coil surrounding the shaft and disposed inside of each of said end-brackets, at the ends of the collector-cylinders furthest removed from said cores, and another field-coil disposed underneath each frame-member arm at each end of the machine for controlling the leakage flux between said arms and the portion of the shaft underneath the collector-cylinder at that end of the machine.

13. A unipolar generator comprising a rotor member including a shaft of magnetizable material, an intermediately disposed rotor-core, and a collector-cylinder disposed at each end of the rotor-core, a stator member including an intermediately disposed stator-core surrounding said rotor-core and separated therefrom by a cylindrical air-gap, said stator member also including a frame member extending axially in each direction from the outer periphery of the stator-core, and an end-bracket for completing the magnetic circuit from each frame member to a point in the shaft outside of the collector-cylinder at that end of the machine, means, including a large number of brushes, spaced both axially and circumferentially, for leading the current respectively from and to the respective collector cylinders, and stator field-exciter means, said stator field-exciter means including a field-coil surrounding the shaft and disposed inside of each of said end-brackets, at the ends of the collector-cylinders furthest removed from said cores, and another field-coil surrounding the shaft and disposed near at least one end of the stator-core.

14. A unipolar generator comprising a rotor member including a shaft of magnetizable material, an intermediately disposed rotor-core, and a collector-cylinder disposed at each end of the rotor-core, a stator member including an intermediately disposed stator-core surrounding said rotor-core and separated therefrom by a cylindrical air-gap, said stator member also including a frame member extending axially in each direction from the outer periphery of the stator-core, and an end-bracket for completing the magnetic circuit from each frame member to a point in the shaft outside of the collector-cylinder at that end of the machine, a plurality of circumferentially spaced brushholder-supporting bars extending axially, in spaced relation, over each of the collector cylinders, brushholder means carried by the brushholder-supporting bars for holding a large number of brushes, spaced both axially and circumferentially, for leading the current respectively from and to the respective collector-cylinders, circuit-connections for providing a loop-circuit at at least one of said collector cylinders whereby current flows from substantially one end of the loop-circuit to substantially the other end thereof, said loop-circuit extending from the rotor-core end of said one of the collector cylinders to the stator-core end of the brushholder-supporting bars thereabove, and stator field-exciter means, said stator field-exciter means including a field-coil surrounding the shaft and disposed inside of each of said end-brackets, at the ends of the collector-cylinders furthest removed from said cores, and another field-coil surrounding the shaft and disposed near at least that end of the stator-core which is adjacent to said loop-circuit.

15. A compensated unipolar generator comprising a rotor member including a shaft of magnetizable material, an intermediately disposed rotor-core, and a collector-cylinder disposed at each end of the rotor-core, a stator member including an intermediately disposed stator-core surrounding said rotor-core and separated therefrom by a cylindrical air-gap, said stator-core being slotted, a plurality of circumferentially spaced compensating bars disposed in said slots of the stator-core, said compensating bars having long ends extending axially, in spaced relation, over the collector-cylinder at one end of the machine to provide brushholder-supporting bars at that end of the machine, said compensating bars having short ends terminating close to the stator-core, at the second end of the machine, a plurality of circumferentially spaced, separate brushholder-supporting bars extending axially, in spaced relation, over the collector-cylinder at said second end of the machine, said separate brushholder-supporting bars being insulated from said short ends of the compensating bars, brushholder means associated with each brushholder-supporting bar for holding a plurality of axially spaced brushes bearing on the collector-cylinder at its end of the machine, each group of axially spaced brushes, at each end of the machine, being electrically connected to one of said brushholder-supporting bars, generator-leads of one polarity connected to the brushholder-supporting bars at said second end of the machine, and generator-leads of the opposite polarity connected to the short ends of said compensating bars at said second end of the machine, said stator member also including a frame member extending axially in each direction from the outer periphery of the stator-core, and an end-bracket for completing the magnetic circuit from each frame member to a point in the shaft outside of the collector-cylinder at that end of the machine, and stator field-exciter means, said stator field-exciter means including a field-coil surrounding the shaft and disposed inside of each of said end-brackets, at the ends of the collector-cylinders furthest removed from said cores, and another field-coil surrounding the shaft and disposed near at least the end of the stator-core at the first-mentioned end of the machine.

16. A compensated unipolar generator comprising a rotor member including a shaft of magnetizable material, an intermediately disposed rotor-core, and a collector-cylinder disposed at each end of the rotor-core, a stator member including an intermediately disposed stator-core surrounding said rotor-core and separated therefrom by a cylindrical air-gap, said stator-core being slotted, a plurality of circumferentially spaced compensating bars disposed in said slots of the stator-core, said compensating bars having long ends extending axially, in spaced relation, over the collector-cylinder at one end of the machine to provide brushholder-supporting bars at that end of the machine, said compensating bars having short ends terminating close to the stator-core, at the second end of the machine, a plurality of circumferentially spaced, separate brushholder-supporting bars extending axially, in spaced relation, over the collector-cylinder at said second end of the machine, said separate brushholder-supporting bars being insulated from said short ends of the compensating bars, brushholder means associated with each brushholder-supporting bar for holding a plurality of axially spaced brushes bearing on the collector-cylinder at its end of the machine, each group of axially spaced brushes, at each end of the machine, being electrically connected to one of said brushholder-supporting bars, generator-leads of one polarity connected to the brushholder-supporting bars at said second end of the machine, said connection being made at the ends of said brushholder-supporting bars adjacent to said short ends of the compensating bars, and generator-leads of the opposite polarity connected to the short ends of said compensating bars at said second end of the machine, said stator member also including a frame member extending axially in each direction from the outer periphery of the stator-core, and an end-bracket for completing the magnetic circuit from each frame member to a point in the shaft outside of the collector-cylinder at that end of the machine, and stator field-exciter means, said stator field-exciter means including a field-coil surrounding the shaft and disposed inside of each of said end-brackets, at the ends of the collector-cylinders furthest removed from said cores, and another field-coil surrounding the shaft near each end of the stator-core.

17. A compensated unipolar generator comprising a rotor member including an intermediately disposed rotor-core and a collector-cylinder disposed at each end of the rotor-core, a stator member including an intermediately disposed stator-core surrounding said rotor-core and separated therefrom by a cylindrical air-gap, said stator-core being slotted, a plurality of circumferentially spaced compensating bars disposed in said slots of the stator-core, a plurality of brushholders and a plurality of brushes carried thereby and bearing on the respective collector-cylinders, generator-leads of one polarity connected to the brushes at one end of the machine, generator-leads of the opposite polarity connected to the compensating bars at the same end of the machine, the brushholders at the other end of the machine being connected to the compensating bars, stator field-exciter means, field-controlling means for controlling the effective ampere-turns of said stator field-exciter means, switching means for connecting and disconnecting said generator-leads to and from a load-circuit, and means for operating said switching means to circuit-make position and for substantially simultaneously actuating said field-controlling means in such direction and degree as to substantially neutralize the tendency of the field-flux to vary as a result of the flow of current being supplied to said load-circuit.

18. A compensated unipolar generator comprising a rotor member including a shaft of magnetizable material, an intermediately disposed rotor-core, and a collector-cylinder disposed at each end of the rotor-core, a stator member including an intermediately disposed stator-core surrounding said rotor-core and separated therefrom by a cylindrical air-gap, said stator member also including a frame member extending axially in each direction from the outer periphery of the stator-core, and an end-bracket for completing the magnetic circuit from each frame member to a point in the shaft outside of the collector-cylinder at that end of the machine, said stator-core being slotted, a plurality of circumferentially spaced compensating bars disposed in said slots of the stator-core, a plurality of brushholders and a plurality of brushes carried thereby and bearing on the respective collector-cylinders, the brushes at one end of the machine being connected to the compensating bars at said end of the machine, a plurality of generator-leads of one polarity connected to the brushes at the second end of the machine, a plurality of generator-leads of the opposite polarity connected to the compensating bars at said second end of the machine, field-exciting means including a field-coil surrounding the shaft and disposed adjacent to the inside of each end-bracket, and means for varying the strength of excitation of one of said field-coils relatively to the other.

19. A compensated unipolar generator comprising a rotor member including an intermediately disposed rotor-core and a collector-cylinder disposed at each end of the rotor-core, a stator member including an intermediately disposed stator-core surrounding said rotor-core and separated therefrom by a cylindrical air-gap, said stator-core being slotted, a plurality of circumferentially spaced compensating bars disposed in said slots of the stator-core, a plurality of brushholders and a plurality of brushes carried thereby and bearing on the respective collector-cylinders, generator-leads of one polarity connected to the brushes at one end of the machine, generator-leads of the opposite polarity connected to the compensating bars at the same end of the machine, the brushholders at the other end of the machine being connected to the compensating bars, switching means for connecting and disconnecting said generator-leads to and from an intermittent load-circuit, stator field-exciter means, means for normally energizing said field-exciter means both before and during the connection of the generator to its load, the machine being of such nature that any large change in the field-flux requires a matter of minutes before it is effected, and means for operating said switching means to circuit-make position and for substantially simultaneously actuating said field-controlling means in such direction and degree as to substantially neutralize the tendency of the field-flux to vary during the supply of current to said intermittent load-circuit.

FLOYD T. HAGUE.
FREDERICK R. J. DAVIS.